United States Patent
Barinov et al.

(10) Patent No.: US 10,114,980 B2
(45) Date of Patent: Oct. 30, 2018

(54) SYSTEM AND METHOD FOR VERIFYING DATA INTEGRITY USING A BLOCKCHAIN NETWORK

(71) Applicant: Acronis International GmbH, Schaffhausen (CH)

(72) Inventors: Igor Barinov, San Mateo, CA (US);
Victor Lysenko, Moscow (RU);
Serguei Beloussov, Singapore (SG);
Mark Shmulevich, Moscow (RU);
Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 105 days.

(21) Appl. No.: 15/215,775

(22) Filed: Jul. 21, 2016

(65) Prior Publication Data
US 2018/0025181 A1    Jan. 25, 2018

(51) Int. Cl.
*G06F 17/30*    (2006.01)
*G06F 21/64*    (2013.01)
*G06F 21/78*    (2013.01)

(52) U.S. Cl.
CPC ............ *G06F 21/645* (2013.01); *G06F 21/78* (2013.01); *G06F 2221/2115* (2013.01); *G06F 2221/2151* (2013.01)

(58) Field of Classification Search
CPC .................. G06F 21/645; G06F 21/78; G06F 2221/2151; G06F 2221/2115
See application file for complete search history.

(56) References Cited

U.S. PATENT DOCUMENTS

| | | | |
|---|---|---|---|
| 8,762,298 B1 * | 6/2014 | Ranjan | G06N 5/02 706/12 |
| 2007/0245420 A1 * | 10/2007 | Yong | H04L 41/28 726/23 |
| 2010/0174793 A1 * | 7/2010 | Wieneke | G06Q 10/107 709/206 |
| 2016/0212146 A1 * | 7/2016 | Wilson | G06F 21/645 |
| 2017/0111566 A1 * | 4/2017 | Nemoto | H04N 9/04 |
| 2017/0249330 A1 * | 8/2017 | Chung | G06F 17/30174 |

* cited by examiner

*Primary Examiner* — Mohammed Waliullah
(74) *Attorney, Agent, or Firm* — Arent Fox LLP; Michael Fainberg

(57) ABSTRACT

A system and method provided for verifying data integrity for large volumes of critical data using blockchain technology. An exemplary method includes storing data files in electronic storage; creating a hash values for of each of the files; and transmitting the hash values to a blockchain network in which one or more nodes in the blockchain network adds the first hash values as blocks to the blockchain. Moreover, an API is provided to monitor data operations performed on the data files and transmit metadata of any operations performed to a transaction log. In turn, hash values relating to the data operations are also created and transmitted to the blockchain network to be added as additional blocks in the blockchain, such that the blockchain can be used to verify the accuracy of the data files stored on the electronic storage.

20 Claims, 4 Drawing Sheets

SYSTEM AND METHOD FOR VERIFYING DATA INTEGRITY USING A BLOCKCHAIN NETWORK

FIELD OF TECHNOLOGY

The present disclosure generally relates to data storage, and, more specifically to a method and system for verifying data integrity using blockchain technology.

BACKGROUND

Continuing advances in storage technology provide significant amounts of digital data to be stored cheaply and efficiently. However, there are many situations where data (e.g., user data or corporate data) needs to be stored in a database or in a data storage for a significant amount of time, such as years or even decades. For example, in the United States, certain federal and state laws require that all medical institutions store medical data (e.g., medical history, medical care, regular check-ups and monitoring, etc.) on patients during his or her lifetime, or even longer. Moreover, similar requirements apply to banking and financial institutions. For example, according to international rules (e.g., the Basel Agreement), banks are required to keep all financial information for a certain period of time (e.g., data relating to accounts, customers, performed transactions and other information about movement of funds, etc.). In these situations, financial, medical and other organizations are required to store huge amounts of data.

Being required to store large amounts of data for long periods of time creates problems in that it is necessary not only to preserve this information, but also to ensure the integrity and authenticity. Moreover, over long periods of time, the data may be subject to a number of threats, including, for example, potential damage by software and/or hardware failure, accidental and/or intentional removal or modification, modification or tampering by fraudsters, and the like.

Therefore, storing such large volumes of data presents a separate issue of checking the integrity of the stored data (i.e., integrity check). Since the number of stored data objects can be very large, the checking procedures (e.g., audits) of the data by third parties, such as services of financial monitoring or control, is usually quite time-consuming and expensive. This is so since the confirming of the data may require a third party (e.g., bank) to be involved, which is trusted by all parties and which guarantees the safety of the information, but also significantly increases the cost through such services.

One existing technology that is capable of storing large volumes of transactional data is blockchain technology. In general, blockchain technology is most widely known as the technology behind the popular cryptocurrency, Bitcoin. A blockchain creates a history of data deposits, messages, or transactions in a series of blocks where each block contains a mathematical summary, called a hash, of the previous block. In turn, this process creates a chain where any changes made to a block will change that block's hash, which must be recomputed and stored in the next block. This changes the hash of the next block, which must also be recomputed and so on until the end of the chain.

Although the hash is simple to compute, there are rules imposed which require the value of the hash to be below a certain threshold value. In addition, the hash is based on a special type of mathematical function that is not reversible (i.e., it cannot be predicted what input can be used to produce the desired output). A valid hash is found by repeatedly adjusting a changeable value in the block, and recalculating the hash until it meets the validity requirements. The freely changeable value is called the nonce. The unpredictable nature of the hash considerably increases the difficulty of finding a nonce that produces a valid hash of the block. Typically, trillions of different nonces must be tried before a valid hash is found. Therefore, changing the value of previously stored data in the blockchain is computationally very expensive.

The security of a blockchain is further increased by implementing it on a distributed network. Blockchains on a distributed network with sufficiently restrictive rules for creating valid blocks are fairly secure against unauthorized changes to the data stored in them. This makes blockchains particularly useful for recording financial transactions.

SUMMARY

In view of the foregoing problems and existing technologies, it is desired to provide a system and method for verifying data integrity for large volumes of critical data using blockchain technology.

According to one aspect, a method is provided for reliability storing data. According to this aspect, the method includes storing a plurality of data files to an electronic data storage; creating a first hash value of each of the plurality of data files stored in the electronic data storage; transmitting the first hash values of each of the plurality of data files to a blockchain network in which at least one node in the blockchain network adds each of the first hash values as one or more blocks in an existing blockchain; monitoring, by a computer processor, the plurality of data files to detect data operations performed on at least one of the plurality of data files; upon detecting at least one data operation, adding metadata relating to the at least one data operation to a transaction log; creating a second hash value of the metadata relating to the at least one data operation; and transmitting the second hash value to the blockchain network in which at least one node in the blockchain network adds the second hash value as one or more additional blocks in the blockchain, such that the blockchain can be used to verify the accuracy of the plurality of data files stored on the electronic data storage.

According to another aspect of the exemplary method, the adding of metadata relating to the at least one data operation to the transaction log comprises adding a timestamp indicating a date and time of when the at least one data operation was performed on the at least one of the plurality of data files.

According to another aspect of the exemplary method, the timestamp indicates a time and date when at least one additional file was stored in the electronic data storage.

According to another aspect of the exemplary method, the method further includes concurrently creating and transmitting the first hash value of the at least one additional file and the second hash value of the timestamp.

According to another aspect of the exemplary method, the adding of metadata relating to the at least one data operation to the transaction log comprises transmitting the metadata to the transaction log, which is stored on a separate computing device from the electronic data storage and the computer processor.

According to another aspect of the exemplary method, the method further includes continuously monitoring, by the computer processor, the plurality of data files to identify additional data operations performed on at least one of the data files; and concurrently creating and transmitting the first hash value of at least one additional file stored in the electronic data storage and the second hash value of a timestamp of when the at least one additional file was stored in the electronic data storage.

According to another aspect of the exemplary method, the monitoring of the plurality of data files comprises periodically scanning, by the computer processor, the plurality of data files to detect data operations performed on at least one of the plurality of data files.

According to another aspect of the exemplary method, the transmitting of the first hash values comprises transmitting the first hash values as part of transaction data that includes file name, file size and storage transaction number of each of the plurality of data files.

According to one aspect, a system is provided for reliability storing data. In this aspect, the system includes electronic data storage configured to store a plurality of data files, create a first hash value of each of the plurality of data files, and transmit the first hash values of each of the plurality of data files to a blockchain network in which at least one node in the blockchain network adds each of the first hash values as one or more blocks in an existing blockchain. Moreover, the system further includes at least one processor configured to: monitor the plurality of data files stored in the electronic data storage to detect data operations performed on at least one of the plurality of data files, upon detecting at least one data operation, adding metadata relating to the at least one data operation to a transaction log, create a second hash value of the metadata relating to the at least one data operation, and transmit the second hash value to the blockchain network in which at least one node in the blockchain network adds the second hash value as one or more additional blocks in the blockchain, such that the blockchain can be used to verify the accuracy of the plurality of data files stored on the electronic data storage.

According to another aspect, a non-transitory computer readable medium storing computer executable instructions is provided for reliability storing data. In this aspect, instructions are included for storing a plurality of data files to an electronic data storage; creating a first hash value of each of the plurality of data files stored in the electronic data storage; transmitting the first hash values of each of the plurality of data files to a blockchain network in which at least one node in the blockchain network adds each of the first hash values as one or more blocks in an existing blockchain; monitoring the plurality of data files to detect data operations performed on at least one of the plurality of data files; upon detecting at least one data operation, adding metadata relating to the at least one data operation to a transaction log; creating a second hash value of the metadata relating to the at least one data operation; and transmitting the second hash value to the blockchain network in which at least one node in the blockchain network adds the second hash value as one or more additional blocks in the blockchain, such that the blockchain can be used to verify the accuracy of the plurality of data files stored on the electronic data storage.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
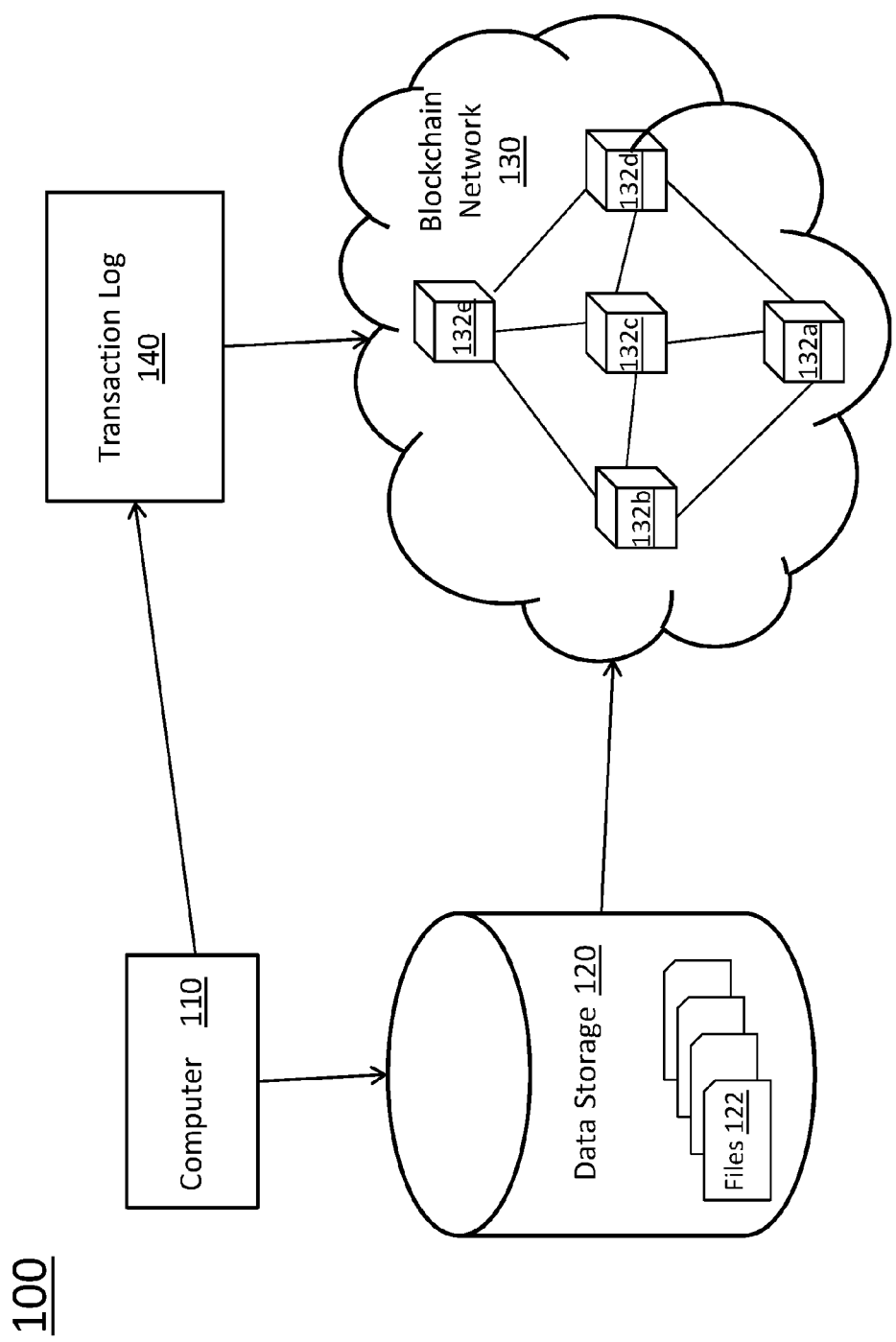
FIG. 1 illustrates a block diagram of a system for storing high volumes of data and ensuring integrity and reliability of the data using blockchain technology according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The present disclosure is directed to a system and method of storing high volumes of data and ensuring integrity and reliability of the data using blockchain technology.

FIG. 1 illustrates a block diagram of a system for storing data using blockchain technology according to an exemplary aspect. As shown, the system 100 generally includes a computer 110, data storage 120, a blockchain network 130 and an external transaction log 140. The details of the computer 110 will be discussed below with respect to FIG. 2, but generally the computer 110 is configured to manage the data storage process, which includes storing files in data storage 120, monitoring changes (e.g., additions, removals, modifications, etc.) to the files, and transmitting metadata to the external transaction log 140 relating to such changes. According to the exemplary aspect, the computer 110 may be any type of computing device, such as a laptop, a desktop, a tablet, a mobile phone and the like. The specific hardware details of the exemplary computer 110 will be described below with respect to FIG. 4.

Furthermore, according to the exemplary aspect, the data storage 120 can generally include hardware and software components configured to manage various storage resources within the computing environment. For example, the data storage 120 can include one or more data storage devices (e.g., hard disk drives, optical drives, magnetic tape drives and/or the like) and storage management software that provides an interface to the one or more data storage devices. The data storage 120, which can be a data cloud storage service according to one aspect, facilitates temporary and/or permanent storage of computer data, including data files 122 of computer 110. The computer data of data files 122 may be any type of electronic, digital data generated and/or stored by a computer. For example, the computer data can represent text data, executable program code, audio, video or image data, or any other type of digital data. As will be discussed in detail below with respect to the exemplary algorithms, the data storage 120 is configured to calculate hash values of files stored thereon and transmit these hash values to blockchain network 130. Additional information can be stored include the file name, size in bytes and storage transaction number of the file.

According to an exemplary aspect, the blockchain network 130 can be an existing (public or private) distributed network formed from a plurality of nodes or computers 132a-132e, for example. In this aspect, the blockchain network 130 maintains a continuously-growing list of data records hardened against tampering and revision and is composed of data structure blocks that exclusively hold the data received from the data storage 120 and transaction log 140 according to the exemplary aspect. In particular, after each of the data storage 120 and the transaction log 140 create and transmit hash values of data (discussed in detail below) and transmit such data (and related data) to the blockchain network 130, the transaction in the blockchain records blocks and confirm when and in what sequence the data transactions enter and are logged in the existing blockchain. Preferably, every node (e.g., computers 132a-132e) in the decentralized system has a copy of the growing blockchain. This design avoids the need to have a centralized database managed by a trusted third party. Moreover, each of the nodes 132a-132e can validate the data, add hash values to their copy of the blockchain and then broadcast these additions to other nodes in accordance with existing blockchain methodologies. In general different blockchain networks have different formats for descriptions of transactions. Thus, while all blockchain networks are generally configured to include hash values of the file, other fields can vary from network to network.

Furthermore, according to the exemplary aspect, the transaction log 140 is a separate external data file(s) that can be stored on a separate data storage device. Similar to the data storage 120, the external transaction log can be stored on one or more data storage devices (e.g., hard disk drives, optical drives, magnetic tape drives and/or the like) and also storage management software that provides an interface to the one or more data storage devices. As will be discussed in more detail below, the transaction log 140 is provided to store metadata relating to operations performed on the one or more files 122 that are transmitted from computer 110 as well as information about the users/devices that add, remove and/or modify the files 122, including the date and time of such transaction (i.e., the "timestamp"), and the like. It should be appreciated that while the transaction log 140 is external to the computer 110, data storage 120 and blockchain network 130 according to the exemplary aspect, the transaction log 140 could be stored on the data storage 120 according to an alternative embodiment. As will be discussed in detail below with respect to the exemplary algorithms, the computing devices storing the transaction log 140 are also configured to calculate hash values of the metadata relating to operations performed on the files these hash values to blockchain network 130.

According to the exemplary aspect, each of the computer 110, the data storage 120, the blockchain network 130 and the external transaction log 140 are configured to transmit data across a network. The applicable network can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

Figure 2:
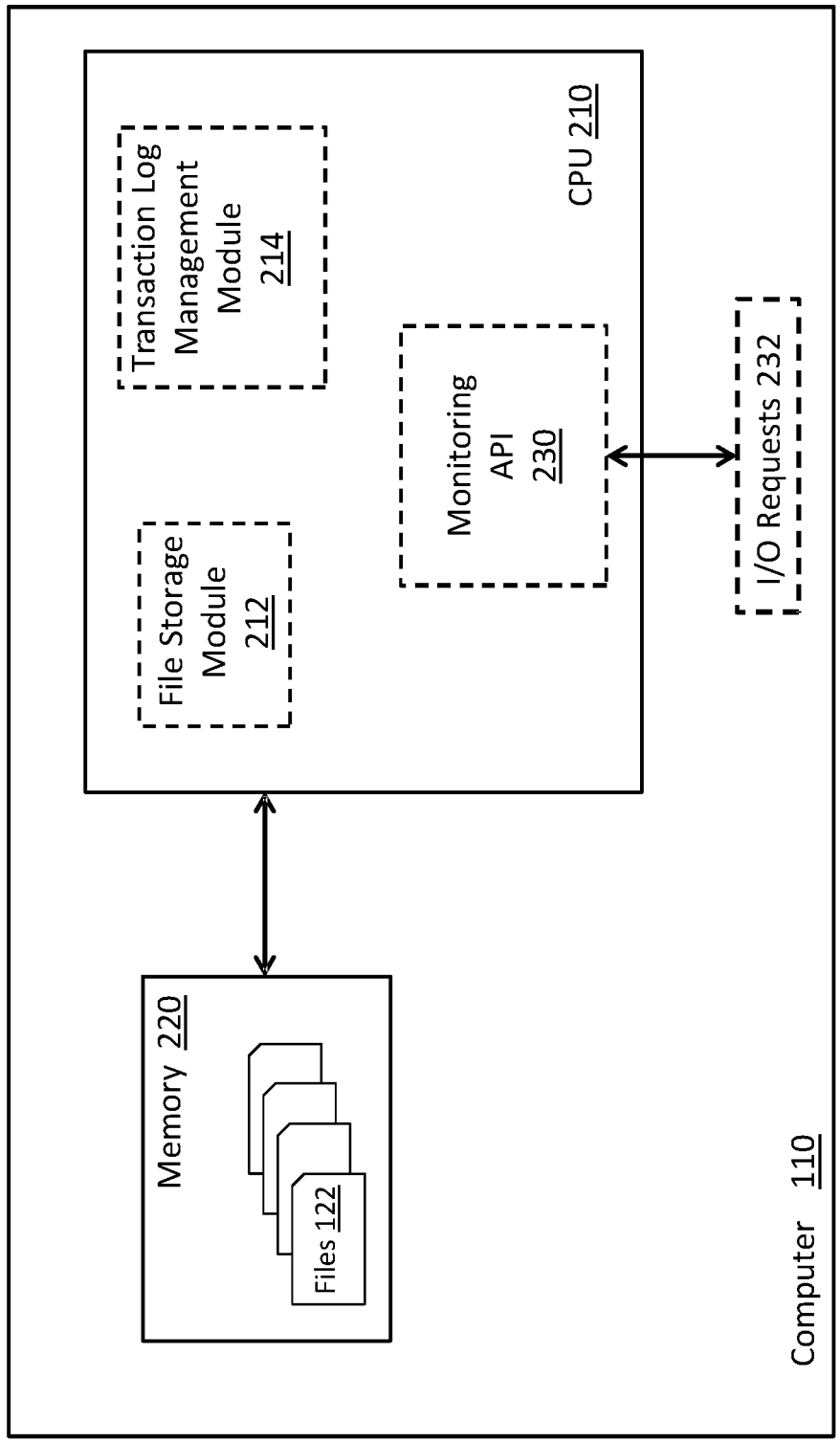
FIG. 2 illustrates a block diagram of the computer of the system shown in FIG. 1 for storing high volumes of data and ensuring integrity and authenticity of the data using blockchain technology according to an exemplary embodiment.

FIG. 2 illustrates a block diagram of the computer 110 system shown in FIG. 1 for the storing of data using blockchain technology according to an exemplary aspect. As shown, the computer 110 includes a central processing unit ("CPU") 210 provided to, among other things, execute a file storage module 212 and a transaction log management module 214. In this aspect, the file storage module 212 and the transaction log management module 214 include software code (e.g., processor executable instructions) in memory, which may be configured to execute/facilitate the storing and managing of data files 122 according to an exemplary embodiment, as will be discussed in more detail below.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

For purposes of this disclosure below with respect to the exemplary algorithms, the disclosure generally refers to the computer 110 and/or CPU 210 and/or one of the specific modules as shown to perform the various steps of the algorithm.

As further shown in FIG. 2, the computer 110 includes electronic memory 220 that stores electronic data, for example, data files 122 as discussed above that are created during a business's operations (e.g. medical or financial data). According to an exemplary aspect, the electronic memory 220 can be a computer-readable medium includes data storage, and, by way of example, and not limitation, can comprise RAM, ROM, EEPROM, CD-ROM, Flash memory or other types of electric, magnetic, or optical storage medium, or any other medium. Moreover, it is contemplated that data files 122 can be any type of electronic data, including critical data such as medical records or banking records, in which it is critical that the data be stored reliability and accurately for extended lengths of time.

According to the exemplary aspect, CPU 210 is configured to execute the file storage module 212 that formats and uploads files (e.g., files 122) to the data storage 120 described above with respect to FIG. 1. Moreover, CPU 210 is configured to execute a monitoring API 230, which is a set of routine definitions, protocols, and tools configured to monitor any changes to the files 122 that are stored on the data storage 120. For example, according to one aspect, monitoring API 230 is configured to intercept input/output requests 232 that can be, for example, file operations such as add file, rename file, delete file, write data and/or the like, performed on the files 122 stored in data storage 120. In other words, API 230 continuously (or periodically) monitors files 122 stored on data storage 120 and determined whenever a new file is added to the data storage 120 or an existing file is delete from or modified on the data storage 120. According to one aspect, the monitoring API 230 is continuously monitoring the files 122. According to another aspect, the monitoring API 230 periodically (e.g., every five minutes, every hour, etc.) checks the files 122 to determine if any file operations have performed.

Moreover, CPU 210 is configured to execute transaction log management module 214 to ensure that the external transaction log 130 maintains a current log of all transaction executed on files 122 stored on the data storage 120. Thus, whenever monitoring API 230 determines a change to one or more of files 122, CPU 210 executes transaction log management module 214, which transmits metadata relating to the transaction(s) to data storage of external transaction log 130 that updates its records accordingly.

Figure 3:
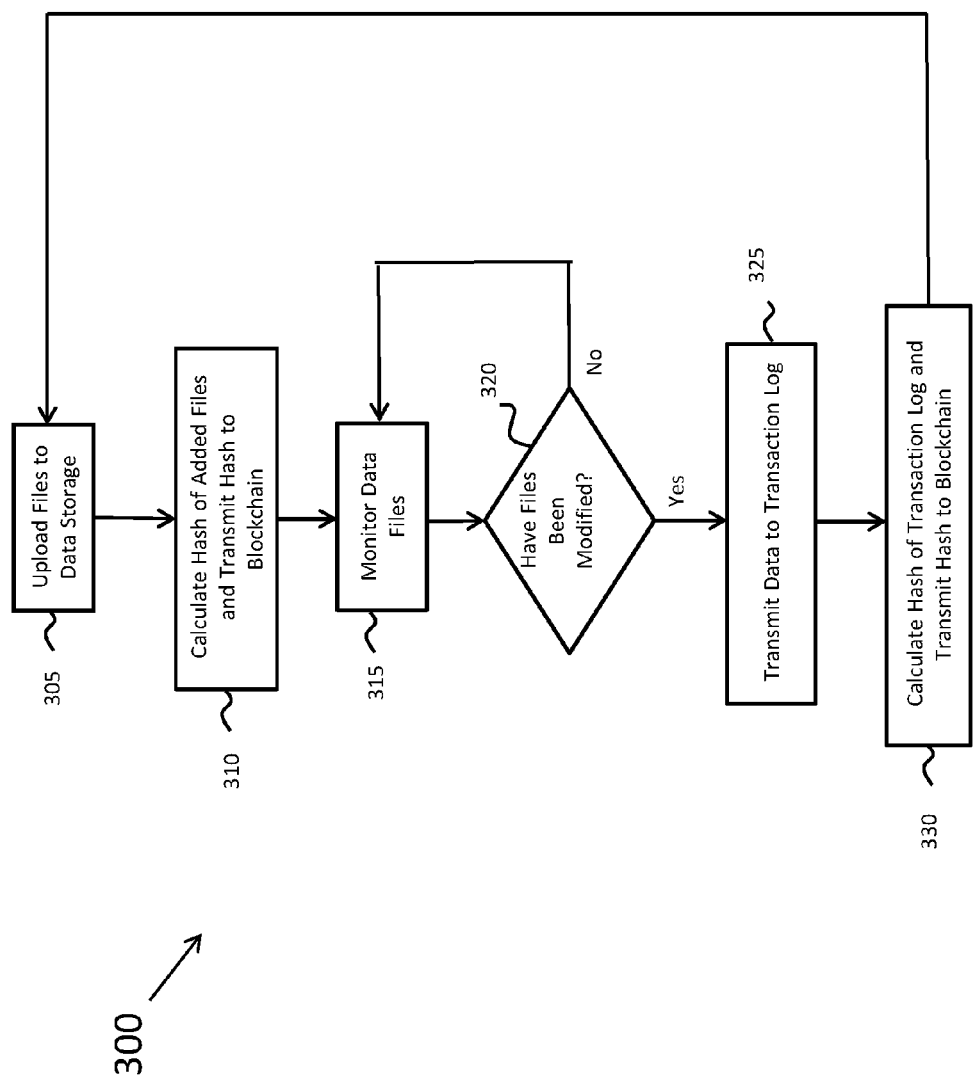
FIG. 3 illustrates a flowchart for a method for storing high volumes of data and ensuring integrity and authenticity of the data using blockchain technology according to an exemplary embodiment.

FIG. 3 illustrates a flowchart for storing high volumes of data and ensuring integrity and authenticity of the data using blockchain technology according to an exemplary embodiment. As shown, initially, at step 305, the computer 110, and, more particularly, file storage module 212, accesses memory 220 and stores one or more files 122 to data storage 120. As described above, the computer 110 may be connected in a local network (e.g., hard wired, over a LAN, etc.) or via a global network, such as the Internet. For example, according to one aspect, the data storage 120 may be data storage provided by cloud computing services, for example.

Next, at step 310, once a data file is stored in data storage 120, a hash value is calculated by and added to the blockchain network 130, and, more particularly, to the next block in the blockchain using existing blockchain methodologies. It should be appreciated that the hash value of the data file can be calculated using known values with the resulting value having a fixed size. For example, the hash value of the data file can be calculated using the MD5 hashing algorithm, resulting in a 128-bit hash value, or using the SHA-256 hashing algorithm, resulting in a 256-bit hash value, applied to the value of the DATA field, including the braces and stripped of spaces and line break symbols, for example. It should be appreciated that the disclosure is not limited to these two common hashing algorithms according to an alternative embodiment.

According to an exemplary aspect, computing devices associated with the data storage 120 calculate the hash value (i.e., a numeric value of a fixed length that uniquely identifies the file 122) and transmits the hash value of the file 122 to the blockchain network 130. In an alternative aspect, the monitoring API 230 determines when a file is added to data storage 120, calculates the hash value for the file and transmits it directly to the blockchain network 130. By sending a hash value of the file to the blockchain network 130, the contents of the file 122 cannot be modified without approval (i.e., unchecked) because any user who has access to data in the blockchain network 130 can compare the hash value of the file 122 with the actual file. Furthermore, in addition to the hash value of the actual file, information relating to the description of the transaction can be transmitted and stored in the blockchain network 130. This information can include the hash value, but also can contain other information about the object/file, such as the file name, MD5 hash, size in bytes of the file, storage transaction number, and the like.

While the blockchain network 130 stores hash values of the file, the monitoring API 130 is configured to continuously monitor the files (step 315) to detect any operations performed on the files 122 (e.g., I/O requests 232). It should be appreciated that while step 315 is illustrated as being performed after step 310 in FIG. 3, the two steps can be performed concurrently. In particular, one file may be added to data storage 120 while another user may be performing certain actions on an existing file in data storage 120. Thus, the exemplary method is configured to concurrently monitor addition of files as well as detect any changes to existing files.

As further shown, at step 320, the monitoring API 130 determines whether any existing files 122 in data storage 120 have been modified (e.g., deleted, modified, updated, etc.). If no changes are detected, the method returns to step 315 and continues to monitor the files. In contrast, if one or more changes to the files 122 are detected, the transaction management module 214 is configured to transmit metadata relating to any such changes to the external transaction log 140 at step 325. As further described above, the transaction log 140 is configured to store and update all metadata relating to operations performed on the files 122. These operations can include the specific type of operation (additions, removal, modification, etc.), information about the user (or user devices) performing such actions on the files, information about the date and time (i.e., the timestamp) of the transaction, and the like.

Since the size of the transaction log will become quite large over time, the system does not place the transaction log in its entirety in the blockchain network 130. Rather, as shown in step 330, the computing devices associated with the transaction log 130 are configured to calculate a hash value of the log entries (or blocks of entries) that can be transmitted to the blockchain network 130 and added to the transaction, and, more particularly, to the next block in the blockchain. For example, according to one aspect, the method creates a hash value for every new log entry (i.e., record) and transmits it to the blockchain network 130 to be added to the blockchain transaction. Moreover, as noted above, the method can also generally create a description of the transaction, which includes the hash value and also other information about the object/file, such as the file name, MD5 hash, size in bytes of the file, storage transaction number, and the like. Similar to the algorithm described above, hash values for the log entries can be created using the MD5 hashing algorithm, the SHA-2 hashing algorithm, or the like. Moreover, it should be appreciate that although the hash of each log entry is calculated external to the computer 110 is the exemplary aspect, in an alternative aspect the hash value of the log entries are calculated by computer 110 if the computer 110 is responsible for directly managing the operations and storage of the transaction log 140.

Finally, as further shown, after step 330 is performed, the exemplary method 300 can continue the process starting again at step 305 (or alternatively, returning to step 315). In this regard, the method can continue to grow the blockchain of data relating to files 122 to reliability store this data taking advantage of the blockchain technology.

In view of the foregoing, the system and method is configured to identify files based on recording a hash value of each file into the transaction of the blockchain network 130. In particular, as noted above, data storage 120 is created and provided to store data files (at significant volumes) and data objects. At the same time, every time a new file is stored in the data storage 120, a hash value of the file is created and recorded into the blockchain network 130. Applying this procedure, the following actions are accomplished. First, all of the files are placed in the storage. Second, hashes of the actual files are added to the transaction of the blockchain network. Third, timestamps are generated both when files are added to storage and when files are modified or deleted. Hash values of these timestamps are also generated and added to the transaction in the blockchain network 130. As a result, a transaction log 140 of operations with the files is created and verified using blockchain system. According to one aspect, this transaction log, as well as the contents of any file, may be subject to external audit by any person if the blockchain network 130 is a public blockchain, and to any person to whom such rights have been granted if the blockchain network 130 is a private blockchain.

For example, in order to perform an audit, the first step is to calculate an MD5 hash of the file. In particular, for a Mac operating system, a user can open a terminal application and type "md5" followed by space and a file name, which will return the MD5 hash of the file. Next, the MD5 hash can be checked to determine if it is equal to an eTag in the DATA field in the notarization certificate. The JSON (JavaScript Object Notation) can be copied from the DATA field and pasted it in a file (removing all spaces and line breaks). Next the SHA-2 hash of the file can be calculated and then checked to determine whether it is equal to a value of HASH field in the notarization certificate. Finally, the data in the Ethereum contract (if using an Ethereum blockchain, for example) can be checked. To do so, replace the HOST and Port to Ethereum node host and port, TX to TRANSACTION ID field in the notarization certificate. Then check that the data field in the result is equal to MERKLE PATRICIA ROOT field in the notarization certificate.

Figure 4:
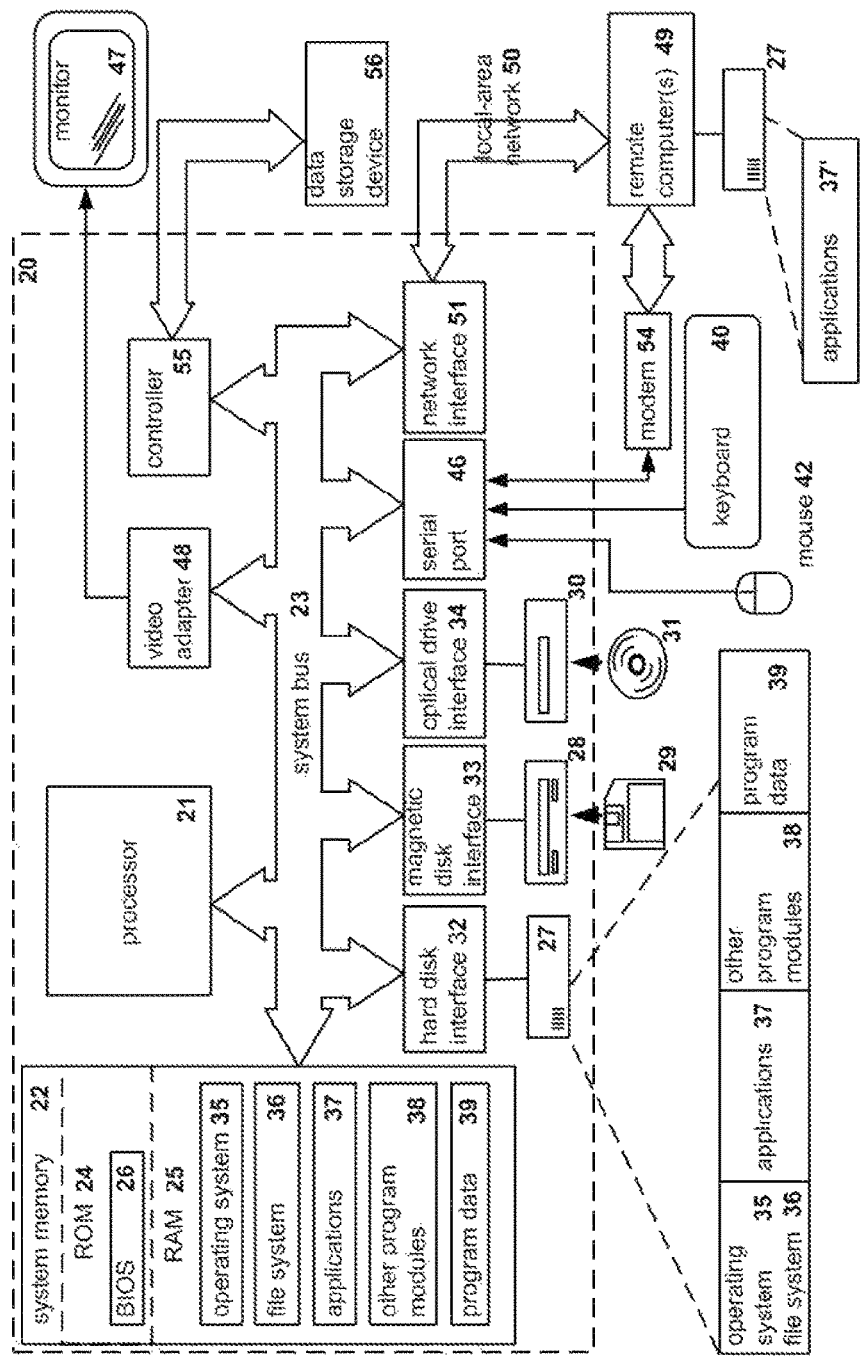
FIG. 4 illustrates an example of a general-purpose computer system on which the disclosed systems and method can be implemented.

FIG. 4 illustrates an example of a general-purpose computer system (which may be a personal computer or a server) on which the disclosed systems and method can be implemented according to an example aspect. It should be appreciated that the detailed general-purpose computer system can correspond to the computer 110 provided to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 210 and the system memory 22 can correspond to memory 220 of FIG. 2, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remove computer(s) 49 can correspond to the computer devices capable of managing transaction log 140, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for reliability storing data, the method comprising:
    storing a plurality of data files to an electronic data storage;
    creating a first hash value of each of the plurality of data files stored in the electronic data storage;
    transmitting the first hash values of each of the plurality of data files to a blockchain network in which at least one node in the blockchain network adds each of the first hash values as one or more blocks in an existing blockchain;
    monitoring, by a computer processor, the plurality of data files to detect data operations performed on at least one of the plurality of data files;
    creating a second hash value of the metadata relating to the at least one data operation;
    transmitting the second hash value to the blockchain network in which at least one node in the blockchain network adds the second hash value as one or more additional blocks in the blockchain, wherein the blockchain is configured to be used to verify the accuracy of the plurality of data files stored on the electronic data storage;
    continuously monitoring, by the computer processor, the plurality of data files to identify additional data operations performed on at least one of the data files; and
    concurrently creating and transmitting to the blockchain network the first hash value of at least one additional file stored in the electronic data storage and the second hash value of a timestamp of when the at least one additional file was stored in the electronic data storage.

2. The method according to claim 1, wherein the monitoring of the plurality of data files comprises periodically scanning, by the computer processor, the plurality of data files to detect data operations performed on at least one of the plurality of data files.

3. The method according to claim 1, wherein the transmitting of the first hash values comprises transmitting the first hash values as part of transaction data that includes file name, file size and storage transaction number of each of the plurality of data files.

4. The method according to claim 1, further comprising:
    upon detecting at least one data operation, adding metadata relating to the at least one data operation to a transaction log.

5. The method according to claim 4, wherein the adding of metadata relating to the at least one data operation to the transaction log comprises adding a timestamp indicating a date and time of when the at least one data operation was performed on the at least one of the plurality of data files.

6. The method according to claim 5, wherein the timestamp indicates a time and date when at least one additional file was stored in the electronic data storage.

7. The method according to claim 6, further comprising concurrently creating and transmitting the first hash value of the at least one additional file and the second hash value of the timestamp.

8. The method according to claim 4, wherein the adding of metadata relating to the at least one data operation to the transaction log comprises transmitting the metadata to the transaction log, which is stored on a separate computing device from the electronic data storage and the computer processor.

9. A system for reliability storing data, the system comprising:
    electronic data storage configured to:
        store a plurality of data files,
        create a first hash value of each of the plurality of data files,
        transmit the first hash values of each of the plurality of data files to a blockchain network in which at least one node in the blockchain network adds each of the first hash values as one or more blocks in an existing blockchain; and
    at least one processor configured to:
        monitor the plurality of data files stored in the electronic data storage to detect data operations performed on at least one of the plurality of data files,
        create a second hash value of the metadata relating to the at least one data operation,
        transmit the second hash value to the blockchain network in which at least one node in the blockchain network adds the second hash value as one or more additional blocks in the blockchain, wherein the blockchain is configured to be used to verify the accuracy of the plurality of data files stored on the electronic data storage, and continuously monitor the plurality of data files to identify additional data operations performed on at least one of the data files; and wherein the electronic data storage is further configured to concurrently create and transmit to the blockchain network the first hash value of at least one additional file stored in the electronic data storage when the at least one processor creates and transmits the second hash value of a timestamp of when the at least one additional file was stored in the electronic data storage.

10. The system according to claim 9, wherein the at least one processor is further configured to monitor the plurality of data files by periodically scanning the plurality of data files to detect data operations performed on at least one of the plurality of data files.

11. The system according to claim 9, wherein the electronic data storage is configured to transmit the first hash values as part of transaction data that includes file name, file size and storage transaction number of each of the plurality of data files.

12. The system according to claim 9, wherein the at least one processor is further configured to:
upon detecting at least one data operation, add metadata relating to the at least one data operation to a transaction log.

13. The system according to claim 12, wherein the at least one processor is further configured to add the metadata relating to the at least one data operation to the transaction log by adding a timestamp indicating a date and time of when the at least one data operation was performed on the at least one of the plurality of data files.

14. The system according to claim 13, wherein the timestamp indicates a time and date when at least one additional file was stored in the electronic data storage.

15. The system according to claim 14, wherein the electronic data storage creates and transmits the first hash value of the at least one additional file concurrently when the at least one processor creates and transmits the second hash value of the timestamp.

16. The system according to claim 12, wherein the at least one processor is further configured to add the metadata relating to the at least one data operation to the transaction log by transmitting the metadata to the transaction log, which is stored on a separate computing device from the electronic data storage and the computer processor.

17. A non-transitory computer readable medium storing computer executable instructions for reliability storing data, including instructions for:

storing a plurality of data files to an electronic data storage;

creating a first hash value of each of the plurality of data files stored in the electronic data storage;

transmitting the first hash values of each of the plurality of data files to a blockchain network in which at least one node in the blockchain network adds each of the first hash values as one or more blocks in an existing blockchain;

monitoring the plurality of data files to detect data operations performed on at least one of the plurality of data files;

creating a second hash value of the metadata relating to the at least one data operation;

transmitting the second hash value to the blockchain network in which at least one node in the blockchain network adds the second hash value as one or more additional blocks in the blockchain, wherein the blockchain is configured to be used to verify the accuracy of the plurality of data files stored on the electronic data storage; and continuously monitoring the plurality of data files to identify additional data operations performed on at least one of the data files; and concurrently creating and transmitting to the blockchain network the first hash value of at least one additional file stored in the electronic data storage and the second hash value of a timestamp of when the at least one additional file was stored in the electronic data storage.

18. The non-transitory computer readable medium according to claim 17, further comprising instructions for:
upon detecting at least one data operation, adding metadata relating to the at least one data operation to a transaction log.

19. The non-transitory computer readable medium according to claim 18, further including instructions for adding of metadata relating to the at least one data operation to the transaction log by adding a timestamp indicating a date and time of when the at least one data operation was performed on the at least one of the plurality of data files.

20. The non-transitory computer readable medium according to claim 19, wherein the timestamp indicates a time and date when at least one additional file was stored in the electronic data storage.

* * * * *